# 3,310,572
PRODUCTION OF TRIOXANE

Heinrich Delle and Hans-Joachim Mann, Mainz (Rhine), Germany, assignors to Deutsche Gold- und Silber-Scheideanstalt vormals Roessler, Frankfurt am Main, Germany
No Drawing. Filed Jan. 13, 1964, Ser. No. 337,151
Claims priority, application Germany, Jan. 18, 1963, D 40,718
3 Claims. (Cl. 260—340)

The present invention relates to an improved process for the production of trioxane.

It is known that trioxane, the cyclic trimer of formaldehyde, can be produced by the rectification of concentrated aqueous methanol free formaldehyde solutions in the presence of strong acids as catalysts. In such processes sulfuric acid, formic acid and p-toluene sulfonic acid have been used as the catalysts.

Such known processes, however, are associated with a number of disadvantages. For example, the concentration of the aqueous formaldehyde used cannot exceed 60% by weight as otherwise the acids employed as catalysts promote a side reaction in which paraformaldehyde is formed. Such paraformaldehyde not only reduces the yield of trioxane but it is also difficult to remove from the reaction medium by depolymerization at the usual reaction temperatures of 90–100° C. Furthermore, sulfuric acid in concentrations above 8% by weight (with reference to the quantity of formaldehyde in the aqueous concentration originally supplied) causes a disproportionation of the formaldehyde to methyl formate and formic acid. This also reduces the yield of trioxane. On the other hand, p-toluene sulfonic acid leads to resinification of the reaction mixture as the aromatic nucleus thereof reacts with formaldehyde and as a consequence catalytic activity is rapidly reduced to only a fraction of the original activity and trioxane formation ceases after elapse of a relatively short period of time.

In the known processes only a maximum of 10% by weight of distillate could be taken off per hour (with reference to the formaldehyde concentrate initially supplied) in order that a sufficient trioxane yield could be attained. In a continuous process the distillate taken off is equal to the throughput. Upon increase of the throughput, the content of oligomeric formaldehyde in the distillate increases and the trioxane yield decreases.

While an increase in the reaction temperature over 100° C. by the addition of inorganic salts or glycerine does increase the velocity of the reaction, it simultaneously promotes the side reactions indicated above and also decreases the trioxane yield.

The object of the present invention is to improve the yields attainable in the acid catalysed production of trioxane by distillation of aqueous formaldehyde concentrates and to provide for a process which is practical and economical to carry out, especially as a continuous process.

According to the invention it was found that the yield of trioxane could be substantially increased with simultaneous increase in throughput and conversion while maintaining the catalyst activity, if the trimerization of the formaldehyde is carried out at temperatures between 95 and 150° C. in an aqueous emulsion comprising aqueous formaldehyde concentrate, sulfuric acid, preferably added in the form of concentrated sulfuric acid (98%), as the acid catalyst and an oily component inert with respect to the formaldehyde, which also is stable at temperatures over 100° C. in an acid medium. Intensive stirring favors the trioxane formation. The aqueous formaldehyde concentrate which can be employed in the process contains 60 to 80%, preferably about 70%, by weight of formaldehyde. It is essential for the process according to the invention that the trimerization is carried out in an emulsion in which such trimerization evidently proceeds as an interfacial reaction.

Paraffin oil and synthetic lubricating oils, such as isomerized polyethylenes and polypropylene glycols, have proved particularly suited as the oily component of the emulsion. It is not necessary that such oily component be completely water insoluble as partially soluble oily components, such as the polypropylene glycols mentioned, are also suited.

While, as indicated, the reaction temperature may be between 95 and 150° C., it preferably is 101–104° C.

The emulsion preferably is composed of about 1 to 3.5 parts by weight of oily component per part by weight of formaldehyde in the aqueous formaldehyde concentrate or, in other words, for example, about 1.5 to 5 parts by weight of oily component per part by weight of the preferred 70% by weight formaldehyde concentrate. The quantity of concentrated sulfuric acid employed preferably is between about 5% and about 15% by weight with reference to the formaldehyde content of the concentrate. However, other proportions of the three components may be employed.

The advantages of the process according to the invention over the known processes reside in the following: By carrying out the reaction of the formaldehyde in the emulsion according to the invention the equilibrium of the trimerization is displaced in favor of the formation of trioxane. In such emulsion catalysis the acid catalyst and formaldehyde concentration may be increased substantially without at the same time increasing the velocity of the side reactions which have been discussed above. As the side reactions only occur to a very minor degree, the throughput as well as the distillation temperature can be increased. The yield of crude trioxane per hour reaches at least 20% by weight (with reference to the quantity of formaldehyde concentrate originally supplied) and therefore is twice as high as in the known processes.

Through the increase in the distillation temperature it is not only possible to increase the velocity of the conversion but also to effect complete removal of the small quantity of paraformaldehyde formed by the addition of a little water.

As already indicated, intensive stirring is advantageous for the production of the emulsion according to the invention. Intensive stirring is to be understood as meaning stirring at about 400 to 4000 r.p.m.

The crude trioxane produced in a continuous process according to the invention is of the following average composition:

46% by weight troxane
21% by weight formaldehyde
remainder water.

This corresponds to a 65% conversion of the formaldehyde supplied to trioxane. In contrast, the previously known processes operate with, as a maximum, only a 50% conversion of the formaldehyde supplied and with relatively lower throughputs of 5–10%, as has already been indicated.

The following examples will serve to illustrate the invention.

EXAMPLE 1

200 parts by weight of paraffin oil were heated to 90° C. in a reaction vessel provided with a stirrer, fractionating column and a heating bath. Thereafter, 100 parts by weight of aqueous 70% by weight formaldehyde concentrate were added thereto and the mixture again heated to 90% C. Then 5 parts by weight of concentrated sulfuric acid (98%) were added thereto with intensive stirring, whereupon the emulsion which was formed was maintained by continuing such intensive stirring. When the heating bath temperature was increased to 105° C., the crude trioxane began to distill over at about 96° C. The fractionating column was maintained at 96° C. with the aid of an electric heating winding. The crude trioxane was condensed in a condenser cooled with water at 60° C. 20 parts by weight of distillate were taken off per hour as an average and simultaneously 20 parts by weight of preheated aqueous 70% by weight formaldehyde concentrate per hour were added to the reaction vessel. As an average the distillate contained 46.4% by weight of trioxane and 21.6% by weight of formaldehyde. The conversion was about 66%. No precipitation of paraformaldehyde was observed in the reaction vessel.

EXAMPLE 2

A mixture of 250 parts by weight of paraffin oil and 10 parts by weight of concentrated sulfuric acid (98%) was heated to 90° C. in an apparatus as described in Example 1. Then while intensively stirring to form an emulsion 100 parts by weight of an aqueous 70% by weight formaldehyde concentrate which also had been perheated to 90° C. were added to such mixture. The bath temperature was increased to 102° C. and maintained constant at such temperature ±1° C. and intensive stirring of the mixture was continued to maintain the emulsion. Crude trioxane of the following average composition distilled over at 96.5° C.: 45.5% by weight of trioxane, 23% by weight of formaldehyde and the remainder water. 20 parts by weight of crude trioxane distillate were taken off per hour while simultaneously 20 parts by weight of preheated aqueous 70% by weight of formaldehyde concentration were added to the reaction vessel per hour. Upon continuing the operation for 36 hours no decrease in conversion and no precipitation of paraformaldehyde occurred. The conversion was 65%.

We claim:
1. A process for the production of trioxane from aqueous formaldehyde concentrates in the presence of an acid catalyst which comprises stirring a mixture of: (1) an aqueous formaldehyde concentrate containing 60 to 80% by weight of formaldehyde, (2) 5 to 15% by weight of concentrated sulfuric acid based on the formaldehyde content of such formaldehyde concentrate and (3) paraffin oil as an oily component which is inert with respect to formaldehyde and also is stable at temperatures over 100° C. in an acid medium, to form an emulsion, heating such emulsion to a reaction temperature of 95 to 150° C. and distilling off the crude trioxane formed from the emulsion.

2. The process of claim 1 in which said aqueous formaldehyde concentrate contains about 70% by weight of formaldehyde, said concentrated sulfuric acid is 98% sulfuric acid and the reaction temperature is between 101 and 104° C.

3. The process of claim 1 in which the quantity of said inert oily component is about 1 to 3.5 parts by weight per part by weight of formaldehyde in the aqueous formaldehyde concentrate in said emulsion.

No references cited.

WALTER A. MODANCE, *Primary Examiner.*

NORMA S. MILESTONE, *Examiner.*